United States Patent [19]
Forehand

[11] Patent Number: 5,742,800
[45] Date of Patent: Apr. 21, 1998

[54] DISC DRIVE RESET USING POWER VALID, CLOCKS VALID AND DELAY CRITERIA

[75] Inventor: Monty A. Forehand, Yukon, Okla.

[73] Assignee: Seagate Technology, Inc., Scotts Valley, Calif.

[21] Appl. No.: 550,714

[22] Filed: Oct. 31, 1995

[51] Int. Cl.$^6$ .............................. G06F 1/04; G06F 1/24
[52] U.S. Cl. .................... 395/555; 395/557; 395/559
[58] Field of Search .................... 395/750, 182.2, 395/182.21, 551, 552, 555, 557, 559, 750.08

[56] References Cited

U.S. PATENT DOCUMENTS

| | | | |
|---|---|---|---|
| 4,679,102 | 7/1987 | Wevers et al. | 360/75 |
| 5,019,996 | 5/1991 | Lee | 364/483 |
| 5,047,876 | 9/1991 | Genheimer et al. | 360/46 |
| 5,107,378 | 4/1992 | Cronch | 360/45 |
| 5,262,907 | 11/1993 | Duffy et al. | 360/77.05 |
| 5,454,114 | 9/1995 | Yach et al. | 395/750 |
| 5,513,358 | 4/1996 | Lundberg et al. | 395/750 |

OTHER PUBLICATIONS

Data Sheet for Motorola MC888916 PLL Clock Driver; pp. 117–124.
Article by T. Kvinge entitled Universal Watchdog Fully Controls μP Reset:, Engineering Design News, May 25, 1995, p. 94.

*Primary Examiner*—Dennis M. Butler
*Attorney, Agent, or Firm*—Bill D. McCarthy; Edward P. Heller, III; Randall K. McCarthy

[57] ABSTRACT

Method and apparatus for resetting a disc drive during a disc drive reset sequence comprising a sequential three-stage reset using power valid, clocks valid and delay criteria. Input voltage provided to the disc drive is monitored to detect the presence of input voltage at a nominally acceptable voltage level, after which a system clock generator initiates generation of a system clock signal. A lock detector circuit employing a PLL circuit monitors the system clock signal and indicates when the system clock signal has achieved frequency stability by way of an output signal, which enables a counter circuit to initiate a timed delay by counting a predetermined number of the system clock signals. During the timed delay, a disc drive system microprocessor is initialized to a known, desired state and the counter provides a reset signal to the system microprocessor at the completion of the timed delay, indicating completion of the reset sequence. A loss of stability in either the input voltage levels or the system clock prevents the issuance of the reset signal; at such time that the stability of the input voltage levels and the system clock are recovered, the reset sequence is reinitiated.

21 Claims, 3 Drawing Sheets

5,742,800

DISC DRIVE RESET USING POWER VALID, CLOCKS VALID AND DELAY CRITERIA

BACKGROUND OF THE INVENTION

1. Field of the Invention

This invention relates generally to the field of disc drive data storage devices, and more particularly, but not by way of limitation, to a method and apparatus for resetting a disc drive using power valid, clocks valid and delay criteria.

2. Discussion

Modern hard disc drives are typically integrated into personal computers (PCs) to provide efficient, large scale storage and retrieval of electronic computer files. A PC generally includes a motherboard having a CPU, computer RAM, and provisions for control and communication with a variety of peripheral devices, such as a monitor, a printer and an external network. A typical PC also includes a number of "standard" internal devices, such as a hard disc drive and one or more floppy disk units, and may include "optional" internal devices such as a CD ROM player and a fax/modem.

Power is typically provided to the PC by way of an internal dc power supply which transforms input ac voltage to a plurality of dc voltage levels and, for portable PCs, power may also be provided by way of an internal battery. In either case, the power source is typically turned on by way of a user operable switch external to the PC so that, once the power source is turned on, power is applied to the motherboard as well as to the internal devices. At such time that the PC is powered up by the user, or receives a hardware reset instruction (soft-boot), the PC enters a reset sequence, during which the circuitry on the motherboard and in each of the various internal devices is reset before being placed into a ready condition.

During such a reset sequence, a successful disc drive reset typically requires the attainment of (1) dc voltages at sufficient levels to operate the drive, (2) stable clock output at the correct frequency from a disc drive system clock generator, and (3) a sufficient number of clock pulses at the correct frequency from the clock generator to ensure a disc drive system microprocessor is initialized to a known, desired state. Once the processor is initialized, it can proceed to initialize the other disc drive logic circuitry as required and initiate a standard operational control program.

One typical prior art approach to resetting a disc drive involves the use of a simple resistor-capacitor (RC) delay circuit, which generates a delay during the reset sequence long enough to allow the disc drive clock generator to stabilize and begin outputting clock signals at the correct clock frequency. A second prior art approach uses detection circuitry to ensure the supplied power has reached acceptable voltage levels, but still specifies a relatively lengthy delay interval to achieve clock stabilization and proper initialization of the circuitry before the disc drive is assumed to be in its desired preset condition.

There are a number of problems, however, associated with prior art approaches to resetting a disc drive. First, these approaches typically specify a lengthy delay during the power up sequence, which is intended to take into account worst-case conditions that may be encountered during power up. Computer users increasingly require improved performance from PCs, including further reductions in the time required to power up the PC and load the operating system, and an excessive amount of delay during the power up sequence runs counter to this requirement.

Next, these approaches assume that the disc drive clock generator will achieve frequency lock during the reset sequence; particularly, the second approach described above generates the delay by counting a predetermined number of clock cycles from the clock generator, while the same clock generator is attaining frequency lock.

Further, these approaches assume that the clocks will lock in a controlled and predictable manner and make no provision to interrupt the reset routine if the clocks become unstable, or the voltage levels drop below acceptable limits, during the reset sequence. Additionally, these prior art approaches will not interrupt system operation if the clock subsequently becomes unstable during normal operation of the disc drive.

There is a need, therefore, for an improved approach to resetting a disc drive which ensures the attainment and maintenance of proper voltage levels and clock operation during a reset sequence without requiring an excessively lengthy delay during the sequence.

SUMMARY OF THE INVENTION

The present invention provides an apparatus and method for resetting a disc drive during a disc drive reset sequence. The reset sequence comprises a sequential three-stage reset, using power valid, clocks valid and delay criteria.

Input voltage provided to the disc drive is monitored to detect the presence of input voltage at a nominally acceptable voltage level, after which a system clock generator initiates generation of a system clock signal. A lock detector circuit monitors the system clock signal and indicates when the system clock signal has achieved frequency stability by way of an output signal, which enables a counter circuit to initiate a timed delay by counting a predetermined number of the system clock signals.

During the timed delay, a disc drive system microprocessor is initialized to a known, desired state and the counter provides a reset signal to the microprocessor at the completion of the timed delay, indicating completion of the reset sequence. A loss of stability in either the input voltage levels or the system clock prevents the issuance of the reset signal; at such time that the stability of the input voltage levels and the system clock are recovered, the reset sequence is reinitiated.

An object of the present invention is to reliably and efficiently reset a disc drive during a disc drive reset sequence.

Another object of the present invention is to ensure the input dc voltage reaches and maintains a nominally acceptable voltage level during the reset sequence.

Still another object of the present invention is to ensure a system clock signal achieves stability before the disc drive system microprocessor is initialized during the sequence, and to ensure the system clock signal remains stable during the microprocessor initialization.

Yet another object of the present invention is to generate a clocked delay of sufficient length to allow the circuit to be initialized without providing unnecessary, excessive delay.

Another object of the present invention is to interrupt disc drive operation if the input power or the system clock signal becomes unstable during normal operation of the drive.

Other objects, advantages and features of the present invention will be apparent from the following description when read in conjunction with the drawings and appended claims.

DESCRIPTION

Figure 1:
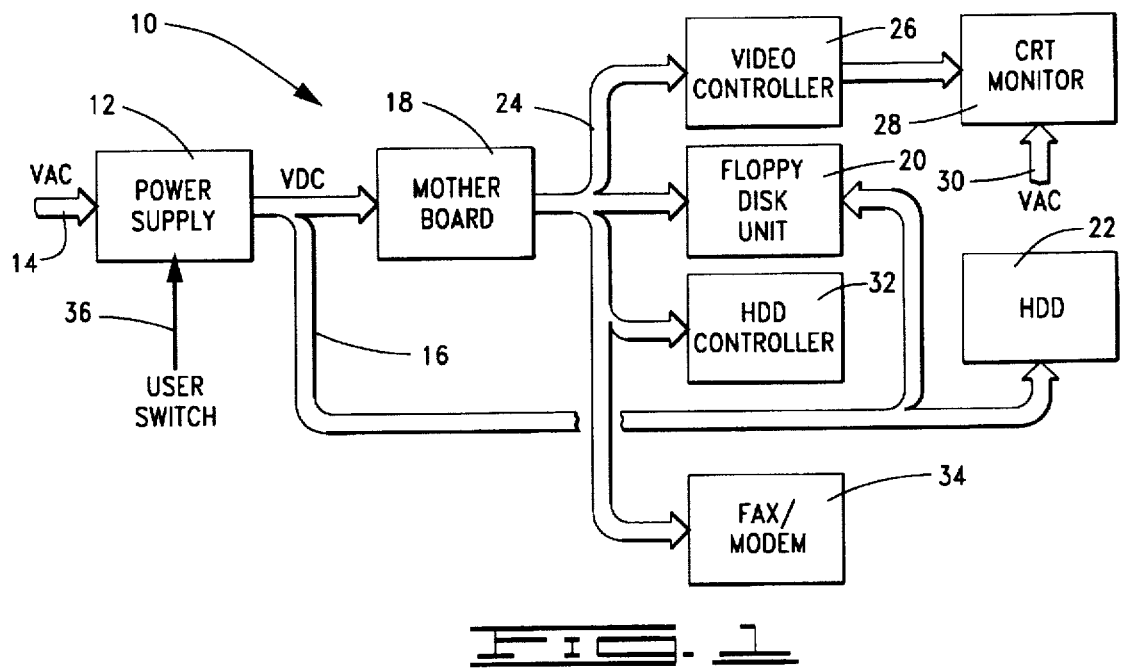
FIG. 1 is a block diagram showing a general power flow layout for a personal computer (PC) system incorporating the present invention.

Turning now to the drawings and more particularly to FIG. 1, shown therein is a block diagram showing a general layout for a personal computer (PC) system 10, incorporating the present invention. FIG. 1 represents a basic desktop computer, with the various constituent elements identified as shown; however, it will be understood that, for purposes of clarity, only selected elements from the PC system 10 are included in order to illustrate the general flow of ac and dc power therein.

Referring now to FIG. 1, the PC system 10 is shown to comprise a conventional dc power supply 12 for converting input single phase 110 VAC (as supplied by ac input line 14) to dc voltages of ±5V, ±12V and ground, for use by the PC system 10. These voltages are provided on a dc voltage bus 16 to a conventional PC motherboard 18, a conventional floppy disk unit 20, and a hard disc drive 22, which is constructed in accordance with the preferred embodiment of the present invention and will be discussed in more detail below. It will be recognized that the voltages provided on dc voltage bus 16 may vary within acceptable limits during normal operation of the power supply 12, so that, for purposes of the present discussion, the dc voltages of ±5V, ±12V and ground represent nominal voltage levels.

The motherboard 18 includes the PC CPU and RAM (not separately shown) and uses the voltages provided by the voltage bus 16 to operate these circuits during PC operation. Additionally, the motherboard 18 passes the input dc voltages in a conventional manner to various controller cards and devices, as shown by dc voltage bus 24. By way of illustration, FIG. 1 shows the dc voltages are provided by way of voltage bus 24 to a video controller card 26, which subsequently provides dc voltages to a CRT monitor 28 (and which also receives input power on ac input line 30). The motherboard 18 further supplies power to the floppy disk unit 20, a conventional hard disc drive controller 32, and a conventional internal fax/modem 34. As will be recognized, the hard disc drive controller 32 provides the necessary interface and control for the disc drive 22.

Finally, FIG. 1 shows the power supply 12 to include a user switch 36, which provides an external switch whereby the computer user can turn on (and off) the power supply 12, and hence, the PC system 10. As described hereinabove, at such time that the user turns on the power supply 12, the various elements shown in FIG. 1 undergo reset sequences in order to place the PC system 10 in a ready condition. The reset sequence of the disc drive 22 is the focus of the present discussion and will be described in more detail below.

Figure 2:
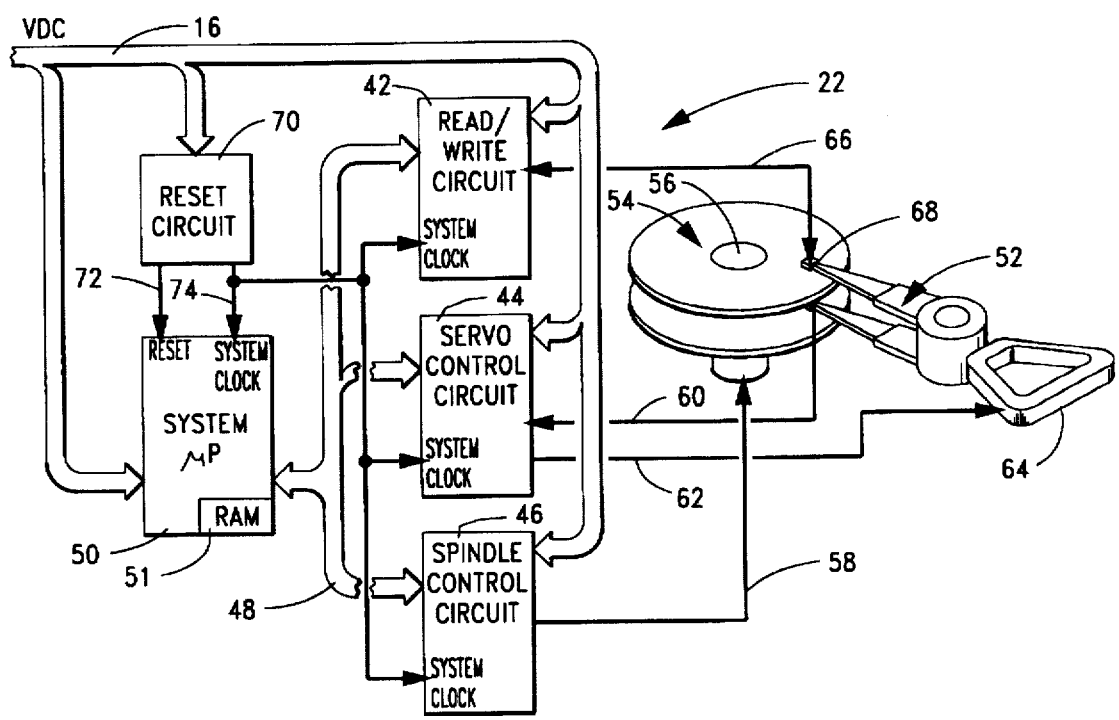
FIG. 2 is a functional block diagram and general power flow layout for the hard disc drive of the PC system shown in FIG. 1.

Referring now to FIG. 2, shown therein is a simplified functional block diagram and general power flow layout of the disc drive 22 of FIG. 1. More particularly, FIG. 2 shows the disc drive 22 to comprise a read/write circuit 42, servo control circuit 44 and spindle control circuit 46, all operably connected by way of signal path 48 to a system microprocessor 50.

Additionally, an actuator assembly 52 and a disc assembly 54 are shown in FIG. 2, with the spindle control circuit 46 controlling the rotational speed of a spindle shaft 56 of the disc assembly 54, as shown by signal path 58. For reference, an example of a disc drive spindle control circuit is discussed in more detail in co-pending U.S. Pat. No. 5,631,999 entitled ADAPTIVE COMPENSATION FOR HARD DISC DRIVE SPINDLE MOTOR MANUFACTURING TOLERANCES, issued May 20, 1997 to Dinsmore, assigned to the assignee of the present invention and incorporated herein by reference.

The servo control circuit 44 receives servo position information from a servo head (not separately designated) by way of signal path 60 and, in response thereto, provides a correction signal by way of signal path 62 to a coil 64 of the actuator assembly 52 in order to position the actuator assembly 52 with respect to the disc assembly 54. For more discussion regarding the construction and operation of a typical servo control circuit, see U.S. Pat. No. 5,262,907 entitled HARD DISC DRIVE WITH IMPROVED SERVO SYSTEM, issued Nov. 16, 1993 to Duffy, McKenzie, Heydari and Woods, assigned to the assignee of the present invention and incorporated herein by reference.

Finally, the read/write circuit 42 passes data to be written to and read from the disc assembly 54, respectively, by way of signal path 66 and a read/write transducer 68. For reference, additional discussion concerning the operation of a typical read/write circuit is provided in U.S. Pat. No. 5,107,378 entitled ADAPTIVE MAGNETIC RECORDING AND READBACK SYSTEM, issued Apr. 21, 1992 to Cronch and Stone, as well as U.S. Pat. No. 5,047,876 entitled ADAPTIVE PREWRITE COMPENSATION APPARATUS, issued Sep. 10, 1991 to Holsinger, both of these references being assigned to the assignee of the present application and incorporated herein by reference.

It will be recognized that the dc voltages generated by the power supply 12 of FIG. 1 are provided by way of the dc voltage bus 16 to the system microprocessor 50, the read/write circuit 42, the servo control circuit 44 and the spindle control circuit 46, in order to power these circuits. Further, it will be recognized that the foregoing functional connections and operation of the disc drive 22 of FIG. 2 are conventional and are provided for purposes of illustration, not limitation, in order to more particularly describe the construction and operation of the circuitry of the preferred embodiment. More particularly, as shown in FIG. 2, the disc drive 22 is shown to include a reset circuit 70, which operates to reset the disc drive 22 during a disc drive reset sequence in accordance with the preferred embodiment of the present invention.

The construction and operation of the reset circuit 70 will be described in more detail hereinbelow, but generally, the circuit receives the dc voltages provided on dc voltage bus 16 and, in response thereto, provides RESET and SYSTEM CLOCK signals by way of signal paths 72 and 74, respectively, at the appropriate times during a disc drive reset sequence. As shown in FIG. 2, the RESET signal is provided to the system microprocessor 50 to indicate the reset sequence has been successfully completed (that is, the system microprocessor 50 has been initiated to a known state) and the SYSTEM CLOCK signal is provided as a "master clock", used by the disc drive circuitry both during initialization of the microprocessor during the reset sequence and during subsequent normal operation of the disc drive. As provided hereinbelow, the reset circuit 70 verifies the stability of the SYSTEM CLOCK signal and the input dc voltage levels during the reset sequence, and will inhibit the RESET signal if these signals become erratic or are lost during the sequence. Further, the RESET signal will be deasserted if these signals subsequently become unstable during normal disc drive operation.

Generally, the reset circuit 70 operates in three sequential stages using power valid, clocks valid and delay criteria. More particularly, the reset circuit 70 first verifies the incoming +5V voltage level (from the dc voltage bus 16) is at or above a nominally acceptable level, sufficient to power the logic circuitry of the disc drive. Next, the reset circuit 70 initiates the SYSTEM CLOCK signal, monitors this signal, and indicates when the signal has stabilized and is operating within acceptable limits. Finally, once the stability of the clock signal has been attained, a timing circuit uses the stabilized clock signal to provide a predetermined delay, during which the system microprocessor 50 is initialized and placed into a known, desired state. At the completion of the predetermined delay, the RESET signal is provided to the system microprocessor 50, indicating the drive is in a ready condition. Upon receipt of the RESET signal, the system microprocessor 50 will initialize the disc drive circuitry as required and then execute a conventional system control program from system microprocessor RAM 51.

Figure 3:
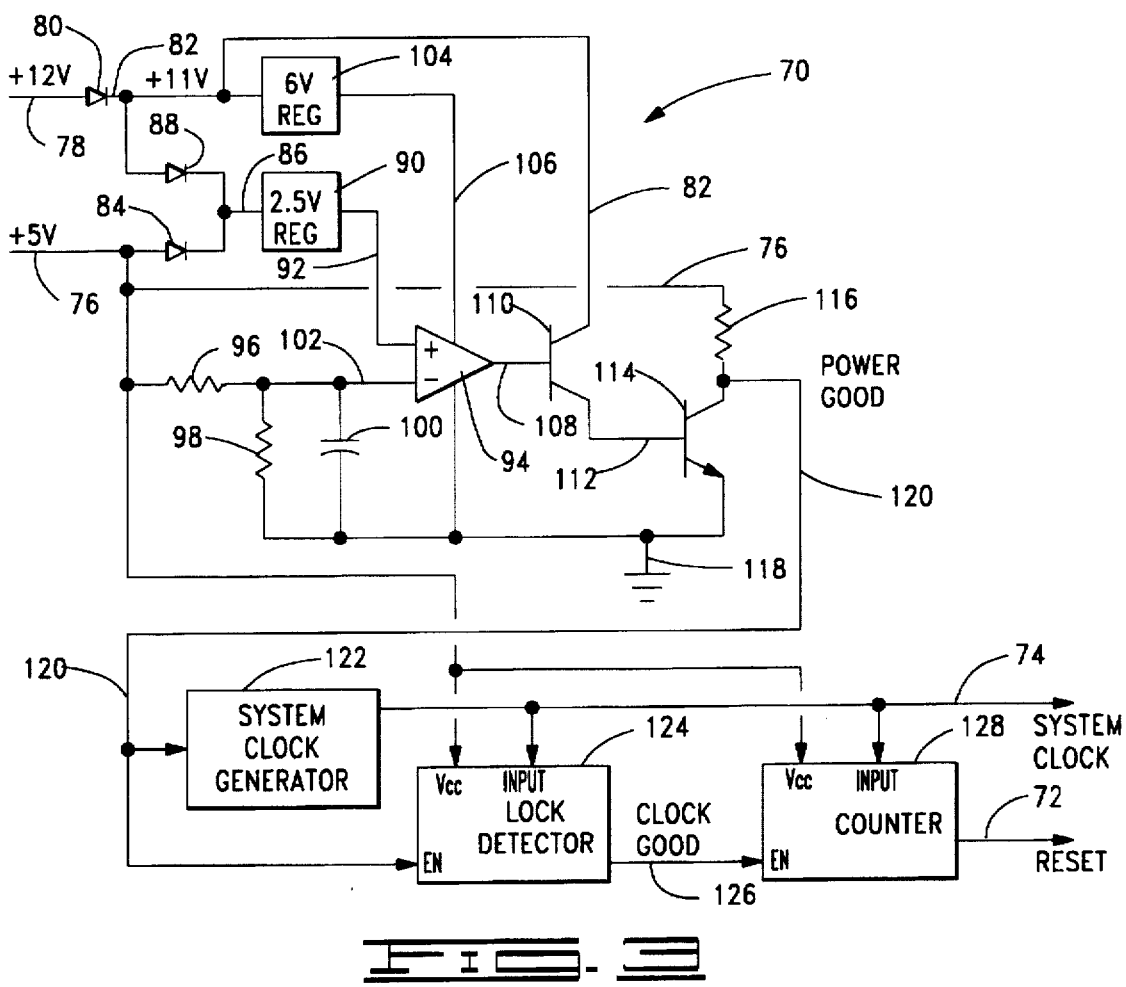
FIG. 3 is a functional block diagram of the reset circuit of the hard disc drive shown in FIG. 2.

Referring now to FIG. 3, shown therein is a functional block diagram of the reset circuit 70 of FIG. 2, constructed in accordance with the preferred embodiment of the present invention. More particularly, FIG. 3 shows the reset circuit 70 as receiving inputs of +5V on signal path 76 and +12V on signal path 78, and providing the RESET and SYSTEM CLOCK signals as outputs on the signal paths 72 and 74, respectively. It will be understood that the output signal paths 72, 74 have been previously shown in FIG. 2, and the input signal paths 76, 78 are part of the dc voltage bus 16, as shown in both FIGS. 1 and 2.

Continuing with FIG. 3, the +12V input on signal path 78 is provided to a diode 80, which provides a small forward-biased voltage drop on signal path 82 (connected to the output of the diode 80). For clarity of illustration, signal path 82 is denoted in FIG. 3 to have a voltage of +11V, which takes into account the small voltage drop across the diode 80. It will be recognized by those skilled in the art that the voltage drop across the diode 80 may not be a full volt, so that the actual voltage on signal path 82 may be greater than +11V; however, for purposes of the following discussion, the voltage on signal path 82 will be referred to as +11V.

As shown in FIG. 3, the +5V input on signal path 76 is provided to a second diode 84, which provides an output (with a correspondingly small voltage drop) on signal path 86. The output of the diode 84 is connected in parallel with the output of a third diode 88, with the +11V voltage from signal path 82 being provided as the input to the diode 88. In this way, voltage is applied by way of signal path 86 to a conventional, high-precision 2.5V regulator 90 which receives an input voltage (from either the +5V or +11V source lines by way of the diodes 84 or 88, respectively) and outputs 2.5V on signal path 92.

The diodes 84 and 88 allow the connection of both the +5V and +11V voltages to the 2.5V regulator 90 and prevent the flow of current from one of these source lines to the other source line when both the +5V and +11V voltages are present. It will be recognized that, during power up of the power supply 12 of FIG. 1, the voltages provided on the signal paths 76 and 78 may not attain nominal voltage levels at the same time, and the configuration of the diodes 84 and 88 allows the attainment of a regulated 2.5V on signal path 92 quickly, regardless of the power up characteristics of the power supply. This is an advantageous feature, as disc drive manufacturers generally cannot economically constrain the use of their drives with power supplies having tightly-specified power up characteristics, but must provide drives capable of handling a variety of power supplies with relatively widely-varying characteristics.

As shown in FIG. 3, the regulated 2.5V on signal path 92 is provided to the +input of a conventional comparator 94. Additionally, the +5V input on signal path 76 is connected to a voltage divider comprising resistors 96 and 98, as well as a filtering capacitor 100, with an output of the voltage divider connected by way of signal path 102 to the −input of the comparator 94. As will be recognized, the values of the resistors 96 and 98 are chosen to provide a voltage of just over 2.5V on signal path 102 when the voltage on the signal path 76 has achieved a nominally acceptable level during power up (which in the present case is about 4.6 V). For purposes of disclosure, in the preferred embodiment the resistor 96 has an effective resistance of about 13.6 kohms, the resistor 98 has an effective resistance of about 16.1 kohms and the capacitor has a value of about 0.01 µF.

The comparator 94 receives an input operating voltage of about +6V, which is supplied by a 6V regulator 104 that receives the +11V voltage from the signal path 82, as shown. During operation, the comparator 94 thus performs a comparison of the voltage on the signal path 92 to the voltage on the signal path 102, and outputs a voltage on signal path 108 which is positive in value at such times that the voltage on signal path 92 is greater than the voltage on signal path 102, and outputs a voltage on signal path 108 that is negative in value when the voltage on signal path 102 is greater than that on signal path 92. The signal path 108 is connected to the base of a transistor 110, which, when the voltage on signal path 108 is positive in value, allows current to pass from signal path 82 (connected to the transistor collector) through the transistor 110 and to signal path 112 (connected to the transistor emitter).

The signal path 112 is also connected to the base of a second transistor 114 as shown. The +5V provided on signal path 76 is serially connected to a pull-up resistor 116 (1.1 kohms in this example) and to the collector of the transistor 114, and the emitter of the transistor 116 is connected to ground 118 (for clarity, the same ground connection at 118 is also shown for the resistor 98, the capacitor 100 and the comparator 94). A signal path 120, denoted in FIG. 3 as providing a signal POWER GOOD, is also connected to the collector of the transistor 114. When the signal path 112 is provided with a voltage level sufficient to turn on the transistor 114, the POWER GOOD signal is driven low to a voltage of about 0V.

Thus, when the +5 and +12 V voltages are initially applied to the reset circuit 70, the POWER GOOD signal will have a low logic state (about 0V), so long as the input voltage on signal path 76 (+5V line) is below the nominally acceptable level. This is because, as will be recognized, the comparator 94 will initially provide a positive voltage to the base of the transistor 110, which will in turn cause a positive voltage to be applied to the base of the transistor 114, so that current will flow through the transistor 114 to ground and pull the POWER GOOD signal low. Once the input voltage on signal path 76 reaches the nominally acceptable level, however, the transistors 110 and 114 will be turned off, and the POWER GOOD signal on signal path 120 will be pulled high (about +5V). In this manner, the POWER GOOD signal at a high logic state indicates acceptable voltage on the +5V input, and will be pulled low if the voltage subsequently drops below the nominally acceptable level. The capacitor 100 provides filtering to prevent small glitches on the +5V input from affecting the state of the POWER GOOD signal.

Continuing with FIG. 3, signal path 120 is shown as an input to a conventional system clock generator 122, which generates the SYSTEM CLOCK signal on the signal path 74 in response to receipt of the POWER GOOD signal on the signal path 120. As provided hereinabove, such clock generators 122 do not instantaneously begin outputting a stable clock signal at the correct frequency; but rather require a certain amount of time in order to stabilize. The actual frequency generated by the system clock generator 122 will, of course, be dependent upon the system requirements, but in the preferred embodiment the system clock generator 122 generates a 30 MHz square wave clock signal.

As shown in FIG. 3, the POWER GOOD signal on signal path 120 is also provided to a lock detector circuit 124, which monitors the SYSTEM CLOCK signal on signal path 74 and outputs a CLOCK GOOD signal on signal path 126 at such time that the SYSTEM CLOCK signal on signal path 74 has stabilized. Particularly, the lock detector circuit 124 employs a phase-locked loop (PLL) circuit that, once enabled by the POWER GOOD signal, attempts to synchrome with the SYSTEM CLOCK signal input; at such time that the SYSTEM CLOCK signal achieves stabilization (within acceptable limits), the lock detector circuit 124 subsequently asserts the CLOCK GOOD signal on the signal path 126. It will be recognized that the loss of the POWER GOOD signal on signal path 120 will result in a loss of both the SYSTEM CLOCK signal on signal path 74, as well as the CLOCK GOOD signal on signal path 126. For purposes of disclosure, the lock detector circuit 124 can be implemented using a Motorola MC88916 PLL Clock Driver.

The CLOCK GOOD signal is provided as an enable input to a serial counter circuit 128, which, once enabled, begins counting the number of clock pulses received from the system clock generator 122 by way of signal path 74. The total number of pulses counted by the counter circuit 128 depends on the total amount of delay required by the system microprocessor 50 (of FIG. 2) in order to achieve proper initialization. Once the required total number of clock pulses is counted, the RESET signal is provided at a high logic state on signal path 72, which, in turn, is provided to the system microprocessor 50 to indicate that the reset sequence has been completed.

Figure 4:
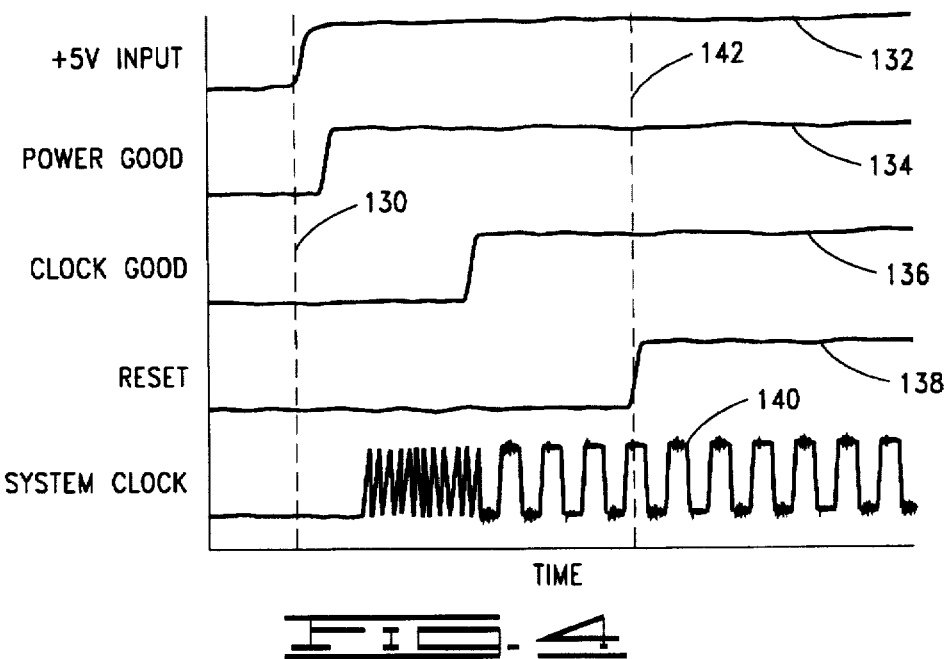
FIG. 4 a graphical representation of the state of various signals generated by the reset circuit shown in FIG. 3 during a reset sequence.

Having concluded a discussion of the construction and operation of the reset circuit 70 of FIG. 3, the present discussion will now turn to FIG. 4, which provides a graphical representation of the state of the various signals identified in FIG. 3, over time. More particularly, FIG. 4 shows graphical representations 132, 134, 136, 138 and 140, respectively, of the following signals from FIG. 3: +5V INPUT (from signal path 76), POWER GOOD (signal path 120), CLOCK GOOD (signal path 126), RESET (signal path 72) and SYSTEM CLOCK (signal path 74). A broken line 130 in FIG. 4 indicates the initiation of a reset sequence (such as the turning on of the power supply 12 of FIG. 1). Immediately after the line 130, the +5V INPUT signal 132 is shown to quickly ramp up to a nominal value of +5V and the POWER GOOD signal 134 correspondingly changes state from low to high when the nominally acceptable level on the +5V INPUT signal 132 is attained. As provided hereinabove, the POWER GOOD signal 134 enables the system clock generator 122 (of FIG. 3) and the lock detector circuit 124 (of FIG. 3). The SYSTEM CLOCK signal 140, which is output from the system clock generator 122 (FIG. 3), is shown in FIG. 4 to initially have a value of 0V,and then have a period of unstable output followed by a subsequent period of stable clock output. As shown, once the SYSTEM CLOCK signal 140 stabilizes, the CLOCK GOOD signal 136 changes state from low to high, enabling the counter circuit 128 (of FIG. 3) to initiate the timed delay required for initialization of the system microprocessor 50 (of FIG. 2). Finally, once the timed delay is completed, the RESET signal 138 changes state from low to high at broken line 142, indicating the disc drive is in a ready condition. Thus, the reset sequence comprises the period of time bounded by the lines 130 and 142, the time prior to line 130 denotes a power off condition, and the time after line 142 denotes a ready condition (and a period of normal operation) for the disc drive 22. It will be recognized that a loss of either stable voltage from the +5V INPUT signal 132 or a loss of a stable SYSTEM CLOCK signal 140 during the period of time bounded by the lines 130, 142 will prevent the completion of the reset sequence, and correspondingly, the reset sequence will restart with the reacquisition of stable power and clocks.

Additionally, as described hereinabove, the loss of stability in either the +5V INPUT signal 132 or the SYSTEM CLOCK signal 140 of FIG. 4 during subsequent operation of the disc drive will cause a deassertion of the RESET signal 138, which will notify the system microprocessor 50 (of FIG. 2) of this error condition. More particularly, FIG. 5 has been provided to show a graphical representation of the state of the various signals previously identified in FIGS. 3 and 4, with a loss of stability of the SYSTEM CLOCK signal 140 occurring during subsequent operation of the disc drive 22. For clarity, FIG. 5 represents operation of the disc drive during the period of time previously identified as occurring beyond (or to the right of) the line 142 in FIG. 4, and so the same identification numbers used for the signals 132, 134, 136, 138 and 140 in FIG. 4 will correspondingly be used for the signals shown in FIG. 5.

Figure 5:
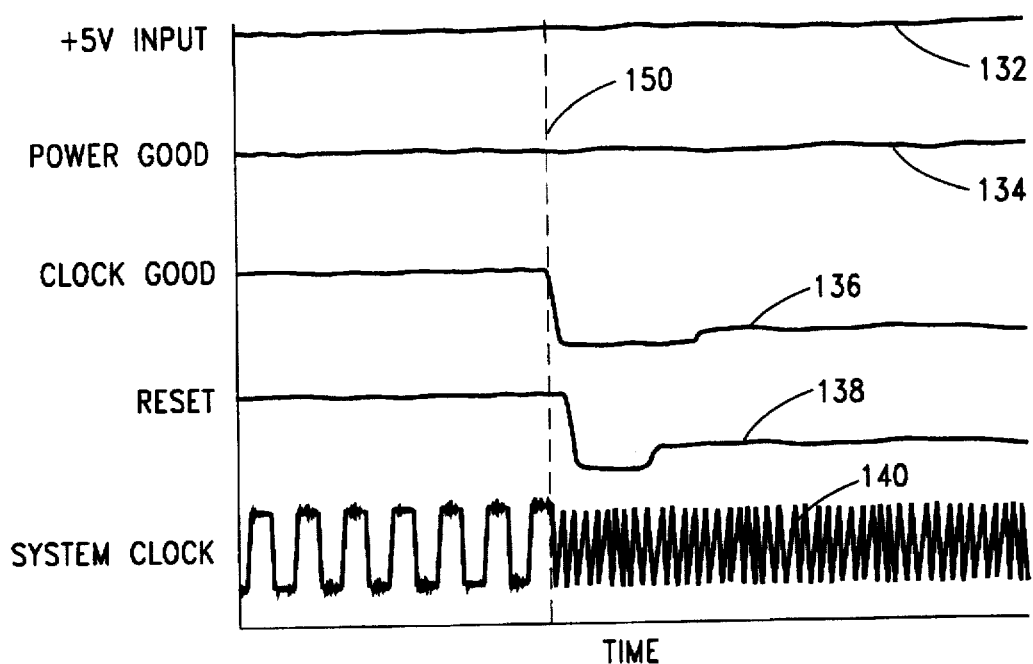
FIG. 5 is a graphical representation of the state of the various signals of FIG. 4 in response to a loss of clock signal stability after the reset sequence has been completed.

Referring now to FIG. 5, the SYSTEM CLOCK signal 140 is shown to change from a stable condition to an unstable condition at a broken line 150. In response thereto, and in accordance with the foregoing description of the reset circuit 70 of FIG. 3, the CLOCK GOOD signal 136 subsequently takes a low state, which in turn also causes the RESET signal 138 to take a low state. It will be recognized that both the +5V INPUT signal 132 and the POWER GOOD signal 134 remain at a high state, but the loss of a stable clock nevertheless causes the system microprocessor 50 (of FIG. 2) to interrupt normal operation of the disc drive in response to receipt of the deasserted RESET signal 138. At such time that the SYSTEM CLOCK signal 140 subsequently reachieves stability (not shown in FIG. 5), the CLOCK GOOD signal 136 and the RESET signal 138 would once again take high states, enabling the system microprocessor 50 to resume normal operation.

Figure 6:
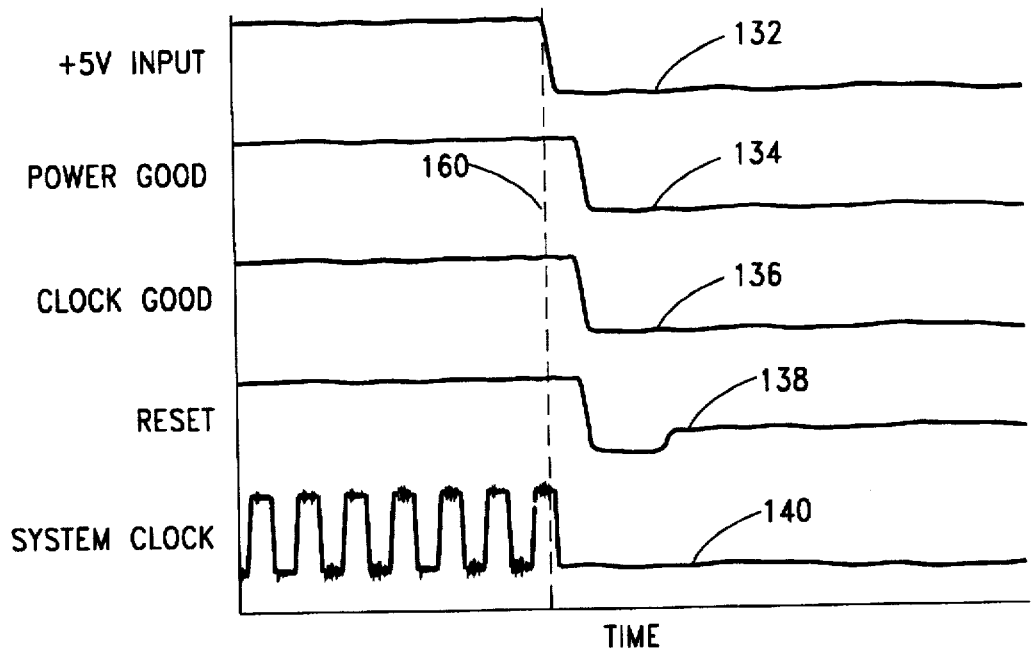
FIG. 6 is a graphical representation of the state of the various signals of FIG. 4 in response to a loss of input voltage to the reset circuit shown in FIG. 3 after the reset sequence has been completed.

Referring now to FIG. 6, shown therein are graphical representations of the same signals previously identified in FIGS. 3–5, but FIG. 6 illustrates the occurrence of a loss of stability in the +5V INPUT signal 132 during normal operation of the disc drive. As shown in FIG. 6, the +5V INPUT signal 132 becomes unstable at a broken line 160 (and eventually drops to 0V). It will be recognized that this could occur as a result of a normal power-down of the power supply 12 of the PC system 10 (of FIG. 1) by the user, or by a momentary loss of the +5V INPUT signal 132. In any case, as described hereinabove, the reset circuit 70 of FIG. 3 operates such that, once the +5V INPUT signal 132 drops below the nominally acceptable voltage level, the POWER GOOD signal 134 will take a low state, as well as the SYSTEM CLOCK signal 140, the CLOCK GOOD signal 136 and the RESET signal 138.

Having now concluded a discussion of FIGS. 4–6, additional considerations will now be presented. As provided hereinabove, FIG. 3 illustrates the preferred embodiment of the present invention, but it will be recognized that the inputting of both +5 and +12V voltages is not required to practice the present invention; that is, the circuitry of FIG. 3 could readily be modified from that shown to a condition wherein the circuitry is operated wholly from a single dc input. For example, the comparator 94 shown in FIG. 3 could receive the necessary operating voltage from the +5V line (whether directly or regulated). Additionally, other system dc voltages could be utilized other than those indicated, such as a logic voltage of about 3.3V, for example.

Further, the circuit of FIG. 3 can readily be used in conjunction with a conventional spindle motor generator circuit (not shown), in which the spinning disc assembly 54 (of FIG. 2) is used to generate a rectified dc voltage once power is shut down to the disc drive. In such a case, the output voltage generated from the spindle motor generator circuit can be connected to the signal path 82 to provide +11V to the circuit, and the diode 80 would prevent current flow from the circuit to the +12V signal path 78. The general use of a spinning disc assembly as a generator by way of a spindle motor generator circuit is discussed in U.S. Pat. No. 4,679,102 entitled METHOD AND MEANS FOR PARKING READ/WRITE HEADS IN A DISC DRIVE USING THE BACK-EMF OF THE SPINDLE MOTOR TO OPERATE A STEPPER MOTOR, issued to Wevers, Krause and Battu, assigned to the assignee of the present invention and incorporated herein by reference.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. An apparatus for providing a disc drive reset sequence, comprising:

detection means for detecting the presence of input voltage and providing a power good signal indicative of the input voltage attaining an acceptable voltage level;

system clock signal generation means, responsive to the power good signal, for generating a system clock signal comprising a series of clock pulses at a selected frequency;

system clock signal monitor means, responsive to the power good signal and the system clock signal, for monitoring the system clock signal and for providing a clock good signal to indicate that the system clock signal has achieved stable frequency operation within predetermined acceptance limits; and timing means, responsive to the system clock signal and the clock good signal, for providing a timed delay by counting a predetermined number of clock pulses from the system clock signal in response to receipt of the clock good signal, the timing means further asserting a reset signal at the completion of the timed delay, the assertion of the reset signal indicative of a ready condition for the disc drive, wherein subsequent loss of an acceptable voltage level for the input voltage level results in deassertion of the reset signal and a suspension of normal disc drive operation, and wherein subsequent loss of stable frequency operation of the system clock signal results in deassertion of the reset signal and a suspension of normal disc drive operation.

2. The apparatus of claim 1, wherein the detection means comprises:

a reference voltage generator comprising a voltage regulator, wherein the voltage regulator receives the input voltage and, in response thereto, outputs a regulated reference voltage signal;

a voltage divider network receiving the input voltage and, in response thereto, providing a divided voltage signal; and a comparator circuit having first and second differential inputs, wherein the first differential input is configured to receive the regulated reference voltage signal from the reference voltage generator and the second differential input is configured to receive the divided voltage signal from the voltage divider network;

wherein the comparator circuit compares the regulated reference voltage signal to the divided voltage signal and outputs a comparison signal indicative of the differential voltage between these signals.

3. The apparatus of claim 2, wherein the power good signal is provided in response to the voltage level of the comparison signal.

4. The apparatus of claim 1, wherein the clock signal monitor means comprises a lock detector circuit employing a phase-locked loop.

5. The apparatus of claim 1, wherein the timing means comprises a counter circuit.

6. The apparatus of claim 1, wherein operation of the timing means and the clock signal monitor means is suspended in response to the input voltage dropping below a nominally acceptable voltage level.

7. The apparatus of claim 6, wherein operation of the timing means is suspended in response to the clock signal subsequently becoming unstable.

8. A disc drive having a system microprocessor for controlling the operation of the disc drive and input means for receiving an input voltage from a dc power source, the disc drive comprising:

detection means for detecting the presence of the input voltage and providing a power good signal indicative of the input voltage attaining an acceptable voltage level;

system clock generation means, responsive to the detection means, for generating a system clock signal comprising a series of clock pulses at a selected frequency;

lock detector means, responsive to the detection means and to the system clock generation means, for providing a clock good signal to indicate that the system clock signal has achieved stable frequency operation within predetermined acceptance limits, the power good signal enabling the lock detector means; and timing means, responsive to the system clock generation means and to the lock detector means, for providing a timed delay by counting a predetermined number of clock pulses from the system clock signal, the clock good Signal enabling the timing means, the timing means further outputting a reset signal indicative of the completion of the timed delay to the system microprocessor, wherein the reset signal denotes a ready condition allowing normal drive operation and wherein a loss of stability in either the input voltage or the system clock signal will cause deassertion of the reset signal, suspending normal drive operation.

9. The disc drive of claim 8, wherein the detection means comprises:

reference voltage generation means for generating a regulated reference voltage signal;

a voltage divider network for receiving the input voltage and generating a divided voltage signal;

a comparator circuit, connected to the reference voltage generation means and the voltage divider network, for comparing the regulated reference voltage signal to the divided voltage signal and outputting a power good signal indicating that the voltage of the divided voltage signal is greater than the voltage of the regulated reference voltage signal.

10. The disc drive of claim 8, wherein the lock detector means employs a phase-locked loop circuit.

11. The disc drive of claim 8, wherein the timing means comprises a counter circuit.

12. The disc drive of claim 8, wherein operation of the timing means and the lock detector means is suspended in response to the input voltage dropping below a nominally acceptable voltage level during the reset sequence.

13. The disc drive of claim 8, wherein operation of the timing means is suspended in response to the frequency of the system clock signal subsequently exceeding the predetermined, acceptable limits.

14. In a disc drive of the type having a disc assembly and an actuator assembly adjacent the disc assembly, the disc drive having spindle control circuitry for controlling the rotational speed of the disc assembly, servo control circuitry for controlling the position of the actuator assembly relative to the disc assembly, and a read/write circuit for passing data to and from the disc assembly by way of a read/write transducer of the actuator assembly in order to perform write and read operations, respectively, the disc drive further having a system microprocessor for controlling the operation of the disc drive and input means for receiving an input voltage from an external power source to power the disc drive, the improvement comprising:

a voltage indication circuit that indicates the presence of input voltage at an acceptable voltage level, the voltage indication circuit including a reference voltage generator for generating a reference voltage, a voltage divider network for providing a divided portion of the input voltage, and a comparator for comparing the reference voltage to the divided portion of the input voltage, the voltage indication circuit providing a power good signal indicative of the input voltage attaining an acceptable voltage level;

a system clock generator, responsive to the power good signal, for generating a system clock signal at a selected frequency, the power good Signal driving the system clock generator;

a lock detector, responsive to the power good signal and to the system clock signal, for determining the frequency of the system clock signal to be within predetermined, acceptable limits and for providing a clock good signal to indicate that the lock detector has phase locked to the system clock signal and the system clock signal has achieved stable frequency operation within predetermined acceptance limits, the power good signal enabling the lock detector.; and a delay generation circuit, responsive to the system clock signal and to the clock good signal, for providing a timed delay by counting a predetermined number of system clock pulses from the system clock signal, the clock good signal enabling the delay generation circuit, the timing means further outputting a reset signal indicative of the completion of the timed delay to the system microprocessor, wherein the reset signal denotes a ready condition allowing normal drive operation and wherein a loss of stability, in either input voltage or system will cause deassertion of the reset signal, suspending normal drive operation.

15. A method for performing a disc drive reset sequence, comprising the steps of:

detecting an input voltage;

providing power good signal indicative of the input voltage attaining an acceptable voltage level;

generating a system clock signal comprising a series of clock pulses at a selected frequency;

generating a clock good signal indicative of the system clock signal attaining stable frequency operation within predetermined acceptance limits;

generating a timed delay by counting a predetermined number of clock pulses from the system clock signal in response to receipt of the clock good signal; and outputting a reset signal at the completion of the timed delay, wherein the reset signal denotes a ready condition allowing normal drive operation and wherein a loss of stability in either input voltage or system clock signal will cause deassertion of the reset signal, suspending normal drive operation.

16. The method of claim 15, wherein the step of providing a power good signal comprises the steps of:

generating a reference voltage signal;

generating a divided voltage signal from a voltage divider network using the input voltage;

comparing the reference voltage signal to the divided voltage signal and outputting a comparison signal indicative of the differential voltage between these signals.

17. The method of claim 15, wherein the step of generating a clock good signal comprises the use of a phase-lock loop to monitor and achieve frequency lock with the clock signal.

18. The method of claim 15, further comprising the step of interrupting the reset sequence if the input voltage drops below a nominally acceptable voltage level.

19. The method of claim 15, further comprising the step of interrupting the reset sequence IF the frequency of the clock signal subsequently exceeds the predetermined acceptance limits.

20. In a disc drive of the type having a disc assembly and an actuator assembly adjacent the disc assembly, the disc drive having spindle control circuitry for controlling the rotational speed of the disc assembly, servo control circuitry for controlling the position of the actuator assembly relative to the disc assembly, and a read/write circuit for passing data to and from the disc assembly by way of a read/write transducer of the actuator assembly in order to perform write and read operations, respectively, the disc drive further having a system microprocessor for controlling the operation of the disc drive and input means for receiving an input voltage from an external power source to power the disc drive, an improved method for resetting the disc drive during a reset sequence, comprising the steps of:

asserting a power good signal indicative of the input voltage being at an acceptable voltage level;

generating a system clock signal comprising a series of clock pulses at a selected frequency;

generating a clock good signal indicative of the system clock signal attaining stable frequency operation within predetermined acceptance limits;

generating a timed delay by counting a predetermined number of system clock pulses; and outputting a reset signal indicative of the completion of the timed delay to the system microprocessor, wherein the reset signal denotes a ready condition allowing normal drive operation and wherein a loss of stability, in either input voltage or system clock signal will cause deassertion of the reset signal, suspending normal disc drive operation.

21. The method of claim 20, wherein the step of detecting the presence of the input voltage comprises the steps of:

generating a reference voltage;

using a voltage divider network to generate a divided voltage signal from the input voltage;

comparing the reference voltage to the divided voltage signal; and generating a power good signal indicative of the input voltage being at an acceptable voltage level.

* * * * *

UNITED STATES PATENT AND TRADEMARK OFFICE
CERTIFICATE OF CORRECTION

PATENT NO. : 5,742,800
DATED : Apr. 21, 1998
INVENTOR(S) : Forehand

It is certified that error appears in the above-identified patent and that said Letters Patent is hereby corrected as shown below:

Column 8, line 40, delete "Will" and insert --will--.

Column 10, line 65, delete "Signal" and insert --signal--.

Column 11, line 57, delete "Signal" and insert --signal--.

Column 12, line 49, delete "IF" and insert --if--.

Signed and Sealed this

Eighth Day of December, 1998

Attest:

BRUCE LEHMAN

*Attesting Officer*　　　　　*Commissioner of Patents and Trademarks*